United States Patent [19]
Feierbach et al.

[11] Patent Number: 5,635,957
[45] Date of Patent: Jun. 3, 1997

[54] CURSOR CONTROL APPARATUS HAVING FOOT OPERATED PEDAL AND METHOD FOR SAME

[75] Inventors: Gary F. Feierbach, Belmont; Miriam Blatt, Menlo Park, both of Calif.

[73] Assignee: Sun Microsystems, Inc., Mountain View, Calif.

[21] Appl. No.: 669,597

[22] Filed: Jun. 24, 1996

Related U.S. Application Data

[63] Continuation of Ser. No. 284,392, Aug. 2, 1994, abandoned.
[51] Int. Cl.$^6$ ............................................................ G06F 3/033
[52] U.S. Cl. .............................................. 345/163; 345/167
[58] Field of Search ........................................ 345/156–184

[56] References Cited

U.S. PATENT DOCUMENTS

| | | | |
|---|---|---|---|
| 3,541,541 | 11/1970 | Engelbart | 340/324 |
| 4,488,146 | 12/1984 | Burchart | 340/407 |
| 4,498,139 | 2/1985 | Malinovsky | 364/518 |
| 4,845,503 | 7/1989 | Adam et al. | 342/448 |
| 4,922,925 | 5/1990 | Crandall et al. | 128/782 |
| 5,082,001 | 1/1992 | Vannier et al. | 128/774 |
| 5,139,261 | 8/1992 | Openiono | 273/148 |
| 5,148,152 | 9/1992 | Stueckle et al. | 340/706 |
| 5,157,381 | 10/1992 | Cheng | 340/710 |
| 5,230,623 | 7/1993 | Guthrie et al. | 433/72 |
| 5,334,997 | 8/1994 | Scallon | 345/167 |
| 5,367,199 | 11/1994 | Lefkowitz et al. | 307/116 |
| 5,367,315 | 11/1994 | Pan | 345/156 |
| 5,396,267 | 3/1995 | Bouton | 345/168 |
| 5,576,727 | 11/1996 | Rosenberg et al. | 345/179 |

FOREIGN PATENT DOCUMENTS

| | | | |
|---|---|---|---|
| 2692386 | 2/1992 | France . | |
| 2692386 | 12/1993 | France | 345/163 |
| 94/16426 | 7/1994 | WIPO | 345/168 |

OTHER PUBLICATIONS

IBM Technical Disclosure Bulletin, Foot–Operated Mouse, vol. 28, No. 11 Apr. 1986.
IBM Technical Disclosure Bulletin, Personal Computer Pedal For Cursor and Other Functions, vol. 28, No. 4, Sep. 1985.
M. Morris Mano, Digital Logic and Computer Design, 1979, pp. 576–578, "Three–State Gate".
IBM Technical Disclosure Bulletin, "Foot–Operated Mouse," Apr. 11, 1986.

Primary Examiner—Mark R. Powell
Assistant Examiner—Christopher T. Albert
Attorney, Agent, or Firm—Flehr Hohbach Test Albritton & Herbert LLP

[57] ABSTRACT

An apparatus for use with a computer having a display. The computer is programmed to provide an indicia on the display. The apparatus includes a control device adapted to be electrically connected to the computer and having an indicia control element for moving the indicia across the display. At least one foot pedal and at least one electrical connector for electrically connecting the at least one foot pedal to the control device are provided. The at least one foot pedal can be used to click on the indicia on the display. A method for operating the computer with the apparatus is provided.

17 Claims, 2 Drawing Sheets

CURSOR CONTROL APPARATUS HAVING FOOT OPERATED PEDAL AND METHOD FOR SAME

This is a continuation of application Ser. No. 08/284,392 filed Aug. 2, 1994, abandoned.

BRIEF DESCRIPTION OF THE INVENTION

This invention relates to a peripheral apparatus for use with a computer and more particularly to an apparatus for use with a cursor or other identifying indicia on a computer display.

BACKGROUND OF THE INVENTION

Mice and similar devices, such as joysticks and track balls, for controlling the movement of a cursor or other identifying indicia on a computer display have heretofore been provided. However, these devices typically have hand operated buttons for selecting or "clicking on" a screen item. These buttons can be difficult to use for operators having certain handicaps. For example, operators suffering from hand paralysis, tendinitis or carpal tunnel syndrome may not be able to effectively use computer mice having such buttons. In fact, it has been discovered that the use of such devices repetitively over time may lead to such problems.

Although certain of the currently available mice indicate that they may be used by the feet of the user for the control of the cursor or other indicia on the screen, they are not readily workable for such use. For example, the x–y position indicator of U.S. Pat. No. 3,541,541 has three buttons 22 which would be extremely difficult, if not impossible, to operate with the feet of the user.

SUMMARY OF THE INVENTION

In general, an apparatus for use with a computer having a display is provided. The computer is programmed to provide an indicia on the display. The apparatus includes a control device adapted to be electrically connected to the computer and having an indicia control element for moving the indicia across the display. At least one foot pedal and at least one electrical connector for electrically connecting the at least one foot pedal to the control device are provided. The at least one foot pedal can be used to click on the indicia on the display. A method for operating the computer with the apparatus is provided.

The at least one foot pedal permits the operator to select or click on a screen item without the use of a hand. This can be particularly advantageous to operators suffering from hand paralysis, tendinitis, carpal tunnel syndrome or certain other handicaps.

DETAILED DESCRIPTION OF THE INVENTION

Reference will now be made in detail to the preferred embodiments of the invention which are illustrated in the accompanying figures. The description of the embodiments of the invention will be followed by a discussion of its operation.

Figure 1:
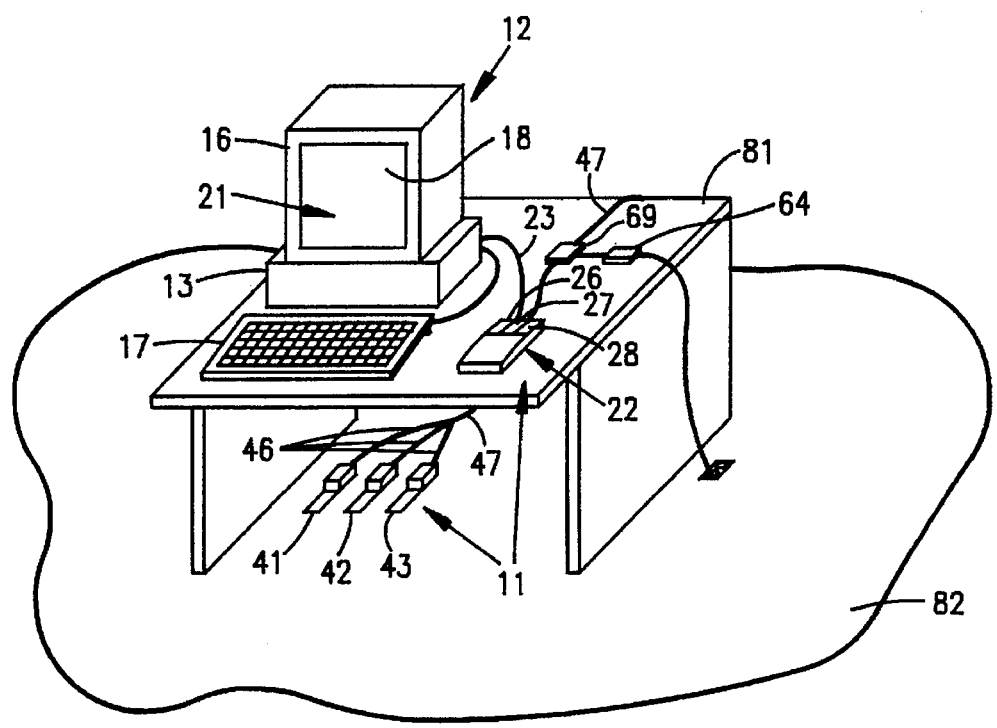
FIG. 1 is an isometric view, somewhat schematic, illustrating a computer system incorporating the cursor control apparatus of the present invention.

Apparatus 11 of the present invention is for use with a computer system 12 which includes a computer 13 and a monitor 16 and keyboard 17 electrically connected to the computer (see FIG. 1). Monitor 16 has a screen or display 18 and computer 13 is programmed to provide an identifying indicia such as a cursor 21 on the display.

Figure 2:
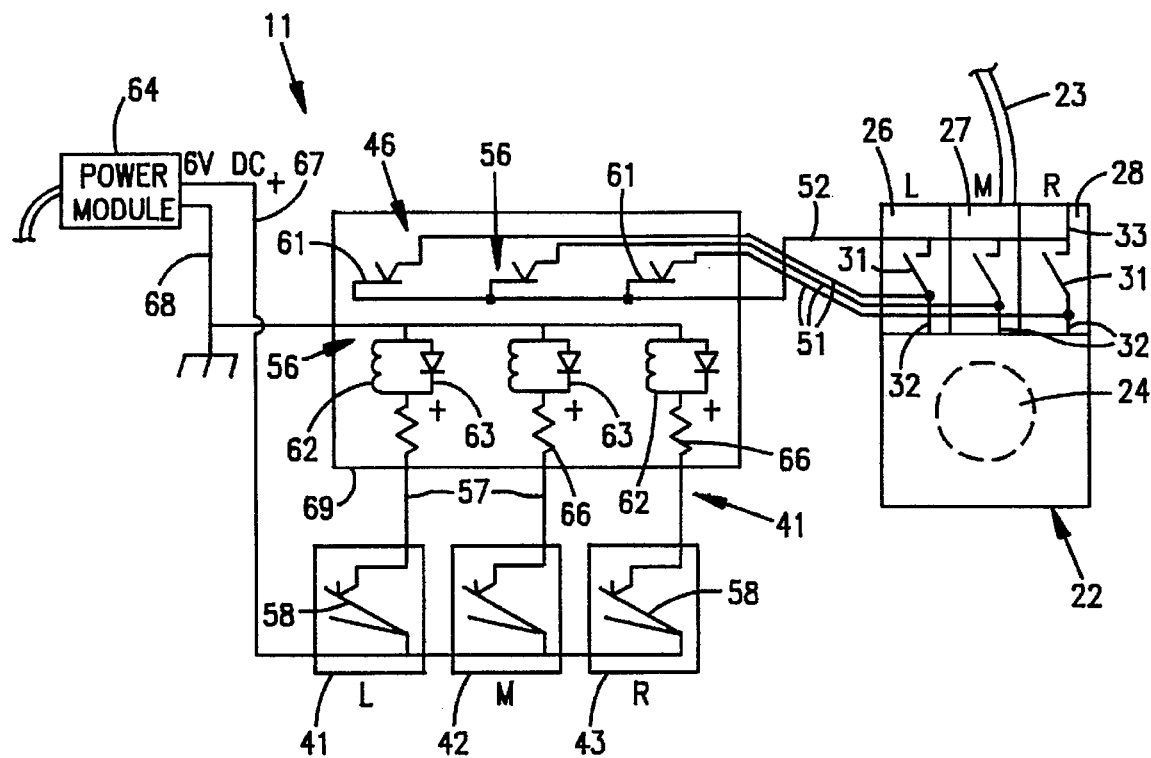
FIG. 2 is an electrical circuit diagram of a portion of the cursor control apparatus illustrated in FIG. 1.

Apparatus 11 includes a device for controlling cursor 21 on display 18 in the form of any suitable conventional x–y position indicator, such as a mouse 22, having a configuration adapted for use by the human hand. It should be appreciated, however, that the x–y position indicator could be in the form of a track ball or a joy stick and be within the scope of the present invention. Mouse 22 is electrically connected to computer 13 or keyboard 17 by cable 23 and is provided with an x–y mechanism or control element in the form of ball 24 for moving cursor 21 across display 18. The mouse further includes at least one button for clicking on cursor 21 appearing on display 18. More in particular as illustrated in FIGS. 1 and 2, mouse 22 is provided with the at least one or left button 26 and additional or middle and right buttons 27 and 28. Each of the buttons is provided with a normally open switch 31 connected to first and second leads 32 and 33 extending through cable 23.

Apparatus 11 is provided with an additional control element for clicking on the cursor on the display in the form of at least one foot pedal. More specifically, apparatus 11 includes at least one or left foot pedal 41 and additional or middle and right foot pedals 42 and 43. The pedals can be of any conventional type such as those made by Roland for the music industry. Pedals 41, 42 and 43 are electrically connected to mouse 22 by respective electrical connectors 46 carried in part by cable 47.

Left, middle and right foot pedals 41, 42 and 43 are respectively connected to left, middle and right mouse buttons 26, 27 and 28 in a parallel configuration so as to serve as an alternate control elements for clicking on cursor 21 on display 18 (see FIG. 2). In this regard, electrical connectors 46 include circuitry for converting each of the foot pedals from a normally closed to a normally open position when foot pedals such as the Roland foot pedals, which are normally closed, are used. Each of normally open switches 31 for the buttons of mouse 22 is connected by a corresponding set of first and second connector leads 51 and 52 to an associated one of inverter circuits 56, which is connected by a lead 57 to the normally closed switch 58 for the respective foot pedal. Each inverter circuit 56 includes a normally closed switch 61 connected to respective connector leads 51 and 52 and operated by an inductor coil 62 coupled in parallel to a diode 63 which, together, are connected in series between a power supply 64 and a foot pedal 58 by a resistor 66 and lead 57. Power supply 64 is coupled to pedal switch 58 and parallelly coupled coil 62 and diode 63 by first and second leads 67 and 68 and can be of any suitable design which provides suitable power, such as six volts of direct current. Resistor 66 need not be used if the resistance of inductor coil 62 is appropriate for use with the voltage level of power supply 64. The inverter circuits can be carried within a box 69 or any other suitable component or accessory such as mouse 22 or foot pedals 41, 42 and 43.

The relays formed by inductor coils 62 and associated switches 61 are of conventional design, and diodes 63 serve to limit reverse electromagnetic fields when power is removed from the inductor coils. More specifically as can be appreciated by those skilled in the art, the energy from power module 64 serves to create an electromagnetic field across each inductor coil 62 which causes switch 61 to remain in an open position so long as pedal switch 58 is in its normally closed position. Upon activation of the respective foot pedal, switch 58 thereof is opened and energy to coil 62 is cutoff so as to cause inverter switch 61 to return to its normally closed position and simulate the closure of the respective button switch 31 to which it is coupled.

Figure 3:
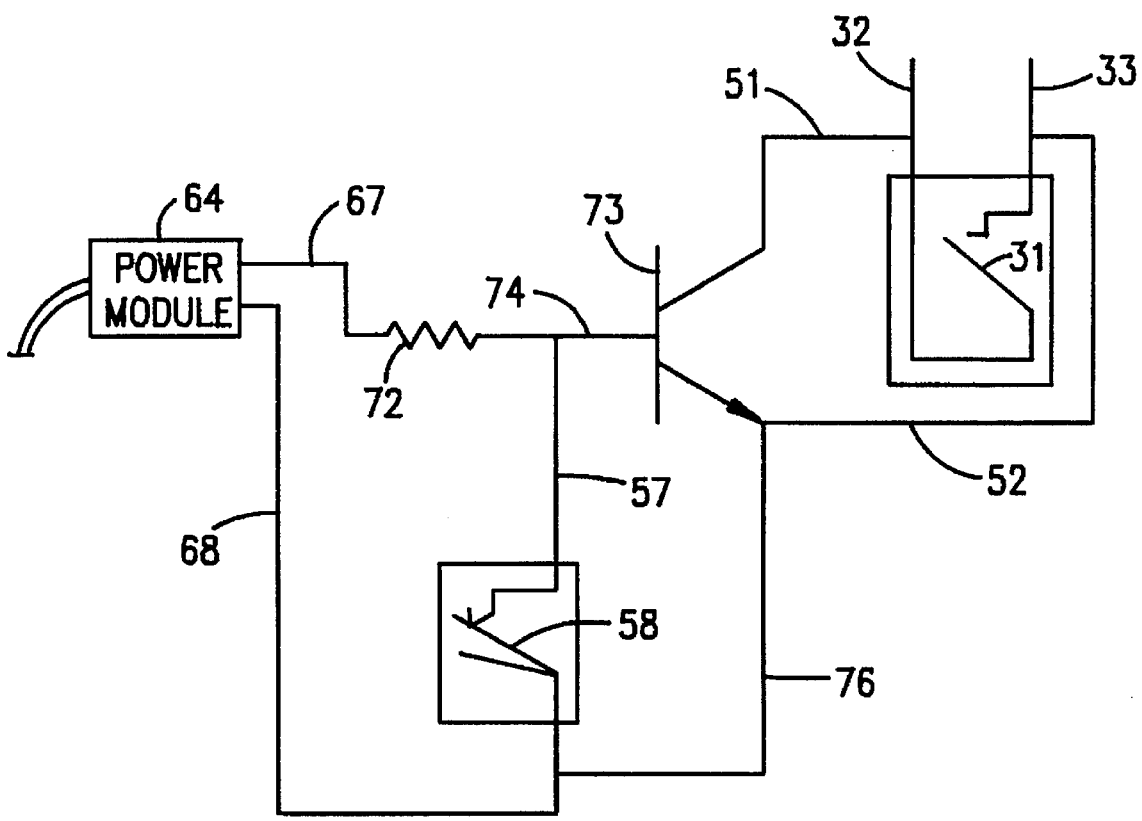
FIG. 3 is an electrical circuit diagram of another embodiment of a portion of the cursor control apparatus illustrated in FIG. 1.

It should be appreciated that solid state or other circuitry is also suitable for converting the foot pedals from a normally closed to a normally open position. FIG. 3 is a schematic diagram of a simple solid state inverter circuit suitable for use with this invention in place of the relays used to form inverter circuits 56 of FIG. 2. In this exemplary embodiment of a solid state inverter, resistor 72, lead 57 and foot pedal switch 58 are connected in series between first and second leads 67 and 68 respectively coupled to power module 64. The junction between resistor 72 and lead 57 is coupled to the base of NPN transistor 73 by lead 74. The emitter of transistor 73 is connected by lead 76 to lead 68 extending to foot pedal switch 58 and by second connector lead 52 to one terminal of an associated one of button switches 31. The collector of the transistor is coupled by first connector lead 51 to the other terminal of the button switch. While the foot pedal switch 58 is closed, current from power supply 64 travels from first lead 67 past resistor 72 and lead 57 through switch 58 and back to the power module via second lead 68. When the foot pedal switch is opened, the current from the power module travels through the collector and then the base of transistor 73 so as to cause current to travel between first and second leads 32 and 33 via first and second connector leads 51 and 52 coupled by the transistor.

Alternatively, normally open foot pedals can be used and be within the scope of the present invention. When such foot pedals are utilized, inverter circuits 56 and other relays are not required and such foot pedals with normally opened switches can be coupled directly in parallel with the associated counterpart hand switches 31 of mouse buttons 26, 27 and 28.

In operation in use, computer system 12 can be used on an elevated support surface such as desk 81 resting on a support surface such as floor 82 (see FIG. 1). The hand manipulation of ball 24 controls the movement of cursor 21 on display 18. Apparatus 11 permits cursor 21 to be clicked on by the feet of the computer operator either separately or in combination with buttons 26, 27 and 28 of mouse 22. More specifically, left, middle and right foot pedals 41, 42 and 43 permit the operator of computer system 12 to click on cursor 21 and/or otherwise operate computer 13 either independent of or in combination with buttons 26, 27 and 28 of mouse 22. Such foot activation of cursor 21 can be particularly useful for computer operators having hand paralysis, tendinitis, carpal tunnel syndrome or other maladies which hinder their effective operation of mouse 22 and, in fact, can be helpful in preventing such maladies from occurring. In this manner, foot pedals 41, 42 and 43 can serve as the primary controller for clicking on cursor 21 and mouse 22 can serve as an additional or ancillary controller in this regard.

The coupling of foot pedals 41, 42 and 43 to mouse 22 (either directly, if normally open, or through inverter circuits 56, if normally closed) permit the conventional debouncing circuitry associated with mouse 22 to be utilized during the operation of the foot pedals. Such debouncing circuitry is typically made part of computer system 12, such as within keyboard 17, or part of the mouse itself. As a result, separate and independent debouncing circuitry dedicated to the foot pedals is not required in apparatus 11.

The cursor control apparatus of the present invention can have other embodiments. For example, in computer systems utilizing mice with less than three buttons, a correspondingly reduced number of foot pedals can be utilized. Alternatively, a hand operable mouse having a ball but no buttons can be provided and one or more pedals can serve as the sole control element for clicking on cursor 21 on display 18.

As can be seen from the forgoing, an apparatus for use with a cursor or other identifying indicia on a computer display has been provided which does not require clicking by the fingers of a human hand. The apparatus includes a foot operated pedal to click on the cursor or other indicia on the computer display. The apparatus can include a device for controlling the cursor or other indicia which is operable by the hand of the user.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. An apparatus for use with a display, a computer programmed to provide an indicia on the display and a mouse electrically connected to the computer for moving the indicia across the display and clicking on the indicia, comprising a switch having an output node adapted for electrically connecting the switch to the mouse, a power supply electrically coupled to the switch and a foot pedal which is closed when at rest electrically coupled to the switch, the switch and the power supply included within circuitry for clicking on the indicia by moving the foot pedal to an open position so that either the foot pedal which is closed when at rest or the mouse can be used to click on the indicia on the display.

2. The apparatus of claim 1 together with an inductor coupled in parallel with a diode, the inductor and diode electrically coupled to the switch for modulating the switch.

3. The apparatus of claim 1 wherein the mouse includes at least first and second buttons to click on the indicia on the display, an additional switch having an output node adapted for electrically connecting the additional switch to the mouse, the power supply being electrically coupled to the additional switch and an additional foot pedal electrically coupled to the additional switch, the additional foot pedal being closed when at rest.

4. The apparatus of claim 1 wherein the switch is a transistor.

5. The apparatus of claim 2 wherein the inductor and diode are electrically coupled between the foot pedal and the switch.

6. An apparatus for use with a display and a computer programmed to provide a cursor on the display, comprising a hand operable mouse adapted to be electrically connected to the computer, the mouse being provided with a cursor control element for moving the cursor across the display and at least one button to click on the cursor on the display, at least one foot pedal and circuitry for electrically connecting the foot pedal to the mouse so that either the mouse or the foot pedal can be used to provide a mouse output signal for clicking on the cursor on the display.

7. The apparatus of claim 6 wherein the circuitry includes a switch electrically coupled to the mouse and a power supply electrically coupled to the switch.

8. The apparatus of claim 6 wherein the foot pedal is closed when at rest.

9. A computer system comprising a monitor having a display, a computer programmed to provide an indicia on the display, a hand operable mouse electrically connected to the computer and having an indicia control element for moving the indicia across the display, a switch electrically coupled to the mouse, a power supply electrically coupled to the switch and at least one foot pedal which is closed when at rest electrically coupled to the switch so that either the mouse or the foot pedal can be used to provide a mouse output signal for clicking on the indicia on the display.

10. The system of claim 9 wherein the switch is a transistor.

11. The system of claim 10 wherein the mouse is electrically connected to the computer with first and second leads and the transistor has a collector and an emitter, the collector electrically connected to the first lead and the emitter electrically connected to the second lead.

12. The system of claim 11 wherein the transistor has a base and the foot pedal is electrically connected to the base.

13. The system of claim 9 wherein the indicia is a cursor.

14. A method for operating a system having a display, a computer programmed to provide an indicia on the display, a mouse electrically coupled to the computer and having a button, a switch electrically coupled to the mouse and at least one foot pedal and a power supply electrically coupled to the switch, comprising the steps of pushing on the foot pedal with a foot to provide a mouse output signal for clicking on the indicia on the display and pushing on the button of the mouse with a hand to provide a mouse output signal for clicking on the indicia on the display.

15. The method of claim 14 further comprising the step of manipulating a ball with a hand to move the indicia across the display.

16. The method of claim 14 further comprising the step of moving the indicia across the display with the mouse.

17. The method of claim 14 wherein the foot pedal is closed when at rest.

* * * * *